US012801150B2

(12) United States Patent
Tang et al.

(10) Patent No.: US 12,801,150 B2
(45) Date of Patent: Nov. 17, 2026

(54) FOOT CONTACT PATTERN(S) AS INTERFACE FOR LANGUAGE TO CONTROL ROBOT(S)

(71) Applicant: GOOGLE LLC, Mountain View, CA (US)

(72) Inventors: Yujin Tang, Kanagawa (JP); Wenhao Yu, Mountain View, CA (US); Jie Tan, Mountain View, CA (US); Byungha Chun, Tokyo (JP); Aleksandra Faust, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/079,035

(22) Filed: Mar. 13, 2025

(65) Prior Publication Data

US 2025/0291351 A1 Sep. 18, 2025

Related U.S. Application Data

(60) Provisional application No. 63/565,892, filed on Mar. 15, 2024.

(51) Int. Cl.
*G05D 1/00* (2024.01)
*G05D 1/2285* (2024.01)
(Continued)

(52) U.S. Cl.
CPC ............. *G05D 1/43* (2024.01); *G05D 1/2285* (2024.01); *B62D 57/032* (2013.01); *G05D 2101/10* (2024.01); *G05D 2109/12* (2024.01)

(58) Field of Classification Search
CPC .... G05D 1/43; G05D 1/2285; G05D 2101/10; G05D 2109/12; B62D 57/032
See application file for complete search history.

(56) References Cited

U.S. PATENT DOCUMENTS 11,654,569 B2 * 5/2023 Blankespoor .......... B25J 9/1628 700/254
12,033,006 B1 * 7/2024 Nair .......................... G06F 8/61
(Continued)

FOREIGN PATENT DOCUMENTS

CN 116483977 A * 7/2023 ......... G06F 16/3329
CN 116774697 A * 9/2023
(Continued)

OTHER PUBLICATIONS

Mandery, C. et al. "Using language models to generate whole-body multi-contact motions," 2016 IEEE/RSJ International Conference on Intelligent Robots and Systems (IROS), Daejeon, Korea (South), 2016, pp. 5411-5418 [online], [retrieved Jun. 8, 2026] at <URL: https://ieeexplore.ieee.org/document/7759796> (Year: 2016).*
(Continued)

*Primary Examiner* — Peter D Nolan
*Assistant Examiner* — Peter Y Ning
(74) *Attorney, Agent, or Firm* — Gray Ice Higdon

(57) ABSTRACT

Various implementations are provided which include receiving an instance of natural language (NL) text input indicating a task for a multi-legged robot to perform in an environment. In many implementations, the system can process the NL text input using a large language model (LLM) to generate a foot contact pattern, indicating a sequence of leg positions of the robot relative to the surface, where one or more of the legs of the robot are in contact with the surface. Additionally or alternatively, the system can generate low-level robot control output by processing the foot contact pattern using a locomotion controller.

22 Claims, 10 Drawing Sheets

(51) Int. Cl.

| | |
|---|---|
| ***G05D 1/43*** | (2024.01) |
| *B62D 57/032* | (2006.01) |
| *G05D 101/10* | (2024.01) |
| *G05D 109/12* | (2024.01) |

(56) References Cited

U.S. PATENT DOCUMENTS

| | | | | |
|---|---|---|---|---|
| 2018/0107175 | A1* | 4/2018 | Ha | G05B 11/01 |
| 2023/0394116 | A1* | 12/2023 | Soeseno | G06F 18/23213 |
| 2024/0095077 | A1* | 3/2024 | Singh | G06F 9/5027 |
| 2024/0130621 | A1* | 4/2024 | Islam | A61B 5/0075 |
| 2024/0153188 | A1* | 5/2024 | Wang | G06T 7/579 |
| 2024/0157548 | A1* | 5/2024 | Galelli Christmann | B25J 9/1605 |
| 2024/0412720 | A1* | 12/2024 | Vasylyev | G06F 16/90332 |
| 2024/0419977 | A1* | 12/2024 | Perez | G06N 3/09 |
| 2024/0428619 | A1* | 12/2024 | Zass | B25J 9/0003 |
| 2025/0145232 | A1* | 5/2025 | Manoonpong | B25J 13/081 |
| 2025/0196339 | A1* | 6/2025 | Aghasadeghi | B25J 9/1612 |
| 2025/0224727 | A1* | 7/2025 | Patel | G05B 13/0265 |
| 2026/0148827 | A1* | 5/2026 | Wagner | G16H 20/30 |

FOREIGN PATENT DOCUMENTS

| | | | | | |
|---|---|---|---|---|---|
| CN | 117549310 | A | * | 2/2024 | B25J 9/163 |
| CN | 118862954 | A | * | 10/2024 | G01C 21/20 |
| CN | 118871919 | A | * | 10/2024 | G06N 3/044 |
| EP | 0856457 | A2 | * | 8/1998 | B62D 57/02 |
| EP | 4617815 | A1 | * | 9/2025 | G06V 20/64 |
| EP | 4745613 | A1 | * | 5/2026 | G01S 13/765 |
| WO | WO-2023144101 | A1 | * | 8/2023 | G06T 7/246 |
| WO | WO-2025038584 | A2 | * | 2/2025 | A01K 15/021 |
| WO | WO-2025053870 | A1 | * | 3/2025 | G06N 3/045 |
| WO | WO-2025186288 | A1 | * | 9/2025 | G16H 50/30 |

OTHER PUBLICATIONS

Wang, Yen-Jen et al. "Prompt a Robot to Walk with Large Language Models." arXiv, 2023, arXiv:2309.09969v2 [online], [retrieved on Jun. 3, 2026]. Retrieved from the Internet <URL: https://arxiv.org/abs/2309.09969v2> (Year: 2023).*

* cited by examiner

300

G = BOUND
FL: 1111100000000000000
FR: 1111100000000000000
RL: 0000111110000000000
RR: 0000111110000000000

→ *t*

FIG. 3A

330

G = TROT
FL: 111111111111111000000
FR: 000000111111111111111
RL: 000000111111111111111
RR: 111111111111111000000

→ *t*

FIG. 3B

360

G = PACE
FL: 1111111110000
FR: 0000111111111
RL: 1111111110000
RR: 0000111111111

→ *t*

FIG. 3C

<General instruction block> 402
You are a dog foot contact pattern expert.
Your job is to give a velocity and a foot contact pattern based on the input.
You will always give the output in the correct format no matter what the input is.

<Gait definition block> 404
1. Trotting is a gait where two diagonally opposite legs strike the ground at the same time.
2. Packing is a gait where the two legs on the left/right side of the body strike the ground at the same time.
3. Bounding is a gait where the two front/rear legs strike the ground at the same time. It has a longer suspension phase where all feet are off the ground, for example, for at least 25% of the cycle length. The gait also gives a happy feeling.

<Output format definition block> 406
The following are rules for describing the velocity and foot contact patterns:
1. You should first output the velocity, then the foot contact pattern.
2. There are five velocities to choose from: [-1.0, -0.5, 0.0, 0.5, 1.0].
3. A pattern has 4 lines, each of which represents the foot contact pattern of a leg.
4. Each line has a label. "FL" is the front left leg, "FR" is the front right leg, "RL" is the rear left leg, and "RR" is the rear right leg.
5. In each line. "0" represents foot in the air, "1" represents foot on the ground.

<Examples block> 408
Input: Trot slowly
Output 0.5
FL: 11111111111111111000000000
FR: 00000000011111111111111111
RL: 00000000011111111111111111
RR: 11111111111111111000000000

Input: Bound in place
Output 0.0
FL: 11111111111100000000000000
FR: 11111111111100000000000000
RL: 00000011111111111100000000
RR: 00000011111111111100000000

Input: Pace backward fast
Output -1.0
FL: 11111111100001111111110000
FR: 00001111111110000111111111
RL: 11111111100001111111110000
RR: 00001111111110000111111111

FIG. 4

400

FOOT CONTACT PATTERN(S) AS INTERFACE FOR LANGUAGE TO CONTROL ROBOT(S)

BACKGROUND

Many robots are programmed to perform certain tasks. For example, a robot on an assembly line can be programmed to recognize certain objects and perform particular manipulations to those certain objects. Additionally, a mobile robot can be programmed to walk with a particular gait.

Further, some robots can perform certain tasks in response to explicit user interface input that corresponds to the certain task. For example, a vacuuming robot can perform a general vacuuming task in response to a spoken utterance of "robot, clean". However, often, user interface inputs that cause a robot to perform a certain task must be mapped explicitly to the task. Accordingly, a robot can be unable to perform certain tasks in response to various free-form natural language inputs of a user attempting to control the robot.

SUMMARY

Various implementations described herein include generating control output, for a mobile robot, based on natural language (NL) user interface input, where the NL user interface input includes free-form natural language text. In some implementations, the system can generate a foot contact pattern based on the NL user interface input. The foot contact pattern is a sequence of robot leg positions, relative to the surface, indicating when one or more of the robot legs makes contact with the surface. In some implementations, the foot contact pattern can be represented as a matrix, with one row corresponding to each leg of the robot, where the row of the matrix captures the position of the corresponding leg over time. In some of those implementations, the foot contact pattern can be generated based on processing the NL user interface input using a generative model, such as a large language model (LLM) or other sequence-to-sequence model. The generated foot contact pattern can be processed using a locomotion controller (e.g., a control policy of a locomotion controller) to generate the control output. The control output can include one or more low-level commands (e.g., one or more motor joint angles) for the robot in performance of the locomotion task indicated by the generated foot contact pattern, which is generated based on the NL text input.

While the LLM can be used to process a wide variety of natural language text input, the LLM may struggle to interpret low-level robot commands such as joint angle targets and/or motor torques, especially for inherently unstable legged robots which necessitate high-frequency control signals. In some implementations, the system can use the foot contact pattern as a bridge between the high-level user-provided natural language descriptions of robot locomotion and the low-level robot commands. The system can generate foot contact patterns for a wide variety of natural language instructions. For example, the NL text input can include explicit instructions for the robot, such as "trot forwards slowly"; "raise your front right leg"; "trot forwards slowly and then pace forward fast"; "trot in place"; etc.

In some implementations, the NL text input of "trot forwards slowly" can cause the robot to move in a trotting gait at a slow speed. Similarly, the NL text input of "raise your front right leg" can cause the robot to move such that it is standing on three legs, with the front right leg not making contact with the surface. Additionally or alternatively, the NL text input of "trot forwards slowly and then pace forwards fast" can cause the robot to move forwards in a trotting gait at a slow speed before moving forwards in a pacing gait at a fast speed. Similarly, the NL text input of "trot in place" can cause the robot to move in a trotting gait while staying in the same position (e.g., moving in a trotting gait without moving forwards or backwards).

Additionally or alternatively, the NL text input can include commands that do not explicitly tell the robot what to do, such as "good news, we are going to a picnic!"; "back off, don't hurt that squirrel"; "act as if the ground is very hot"; "act as if you have a limping rear left leg"; "go catch that squirrel on the tree"; etc. By leveraging the natural language understanding of the LLM, the system can generate foot contact patterns without explicit commands. Additionally or alternatively, the system can generate foot contact patterns that relate to one or more emotions (e.g., the robot can act "excited" in response to the NL text input of "good news, we are going to a picnic!").

In some implementations, the NL text input of "good news, we are going to a picnic!" can cause the robot to jump up and down. Similarly, the NL text input of "back off, don't hurt that squirrel!" can cause the robot to move backwards slowly in a trotting gait. Additionally or alternatively, the NL text input of "act as if the ground is very hot" can cause the robot to move in a fast pacing gait, with its feet barely touching the ground. Similarly, the NL text input of "act as if you have a limping rear left leg" can cause the robot to struggle to walk while barely moving its rear left leg. Furthermore, the NL text input of "go catch that squirrel on the tree" can cause the robot to move in a bounding gait forward at a fast speed towards the prey.

In some implementations, the foot contact pattern can be represented by a sequence of binary values indicating whether the corresponding leg makes contact with a surface across a sequence of time steps. For example, the foot contact pattern can include a '0' indicating a corresponding leg is in the air (i.e., not making contact with the surface), and a '1' indicating the corresponding leg is making contact with the surface. Additionally or alternatively, the foot contact pattern can include one or more additional values indicating a first height of the robot's leg while it is in the air (and not making contact with the surface). For example, the sequence of values can range from [0, 1], where the value '0' indicates the leg is in at its tallest height, the value '1' indicates the leg is touching the surface, the value '0.5' indicates the leg is at a positing halfway the first height and the surface, etc.

In some implementations, the system can train the locomotion controller (e.g., the control policy of the locomotion controller) using one or more training foot contact patterns generated using a random pattern generator. For example, the system can train a control policy based on five robot gait types: G∈{BOUND, TROT, PACE, STAND_STILL, STAND_3LEGS}. The random pattern generator can sample a pattern length T and/or the ground contact length within the cycle for each of the feet. Additionally or alternatively, the random pattern generator can determine the ratio of '1's to '0's in the training foot contact pattern based on the pattern length and/or the ground contact length. In some implementations, the random pattern generator can additionally or alternatively shift the '1's and '0's based on the selected gait.

The system can process the training foot contact pattern, a linear velocity, and one or more instances of sensor data capturing the pose of the robot using the control policy to generate one or more low-level robot commands. In some implementations, the system can generate one or more rewards based on the one or more low-level commands, where one or more portions of the control policy can be updated via reinforcement learning based on the reward(s).

Accordingly, various implementations described herein include generating a foot contact pattern using a large language model (LLM), where the foot contact pattern can bridge (1) a human command in natural language to control a robot and (2) a locomotion controller that outputs low-level commands (e.g., joint angle targets, motor torques, etc.) to control the robot. Using foot contact patterns to generate low-level robot commands allows the system to leverage the natural language understanding of LLMs. In some implementations, the system can generate low-level commands based on foot contact patterns generated by process instances of NL text input using the LLM, where the system would not be able to generate low-level commands robot commands based solely on the NL text input. By leveraging the natural language understanding of the LLM, the system can generate foot contact patterns for a wide variety of NL text input including NL text input that does not explicitly tell the robot what to do (e.g., "go catch that squirrel on the tree").

The above description is provided as an overview of only some implementations disclosed herein. These and other implementations are described in more detail herein, including in the detailed description and the claims.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3A illustrates an example foot contact pattern generated using an LLM, where the foot contact pattern corresponds with bounding in accordance with some implementations.

FIG. 3B illustrates another example foot contact pattern generated using an LLM, where the foot contact pattern corresponds with trotting in accordance with some implementations.

FIG. 3C illustrates a further example foot contact pattern generated using an LLM, where the foot contact pattern corresponds with pacing in accordance with some implementations.

FIG. 4 illustrates example LLM prompts for generating a foot contact pattern in accordance with some implementations.

DETAILED DESCRIPTION

Figure 1:
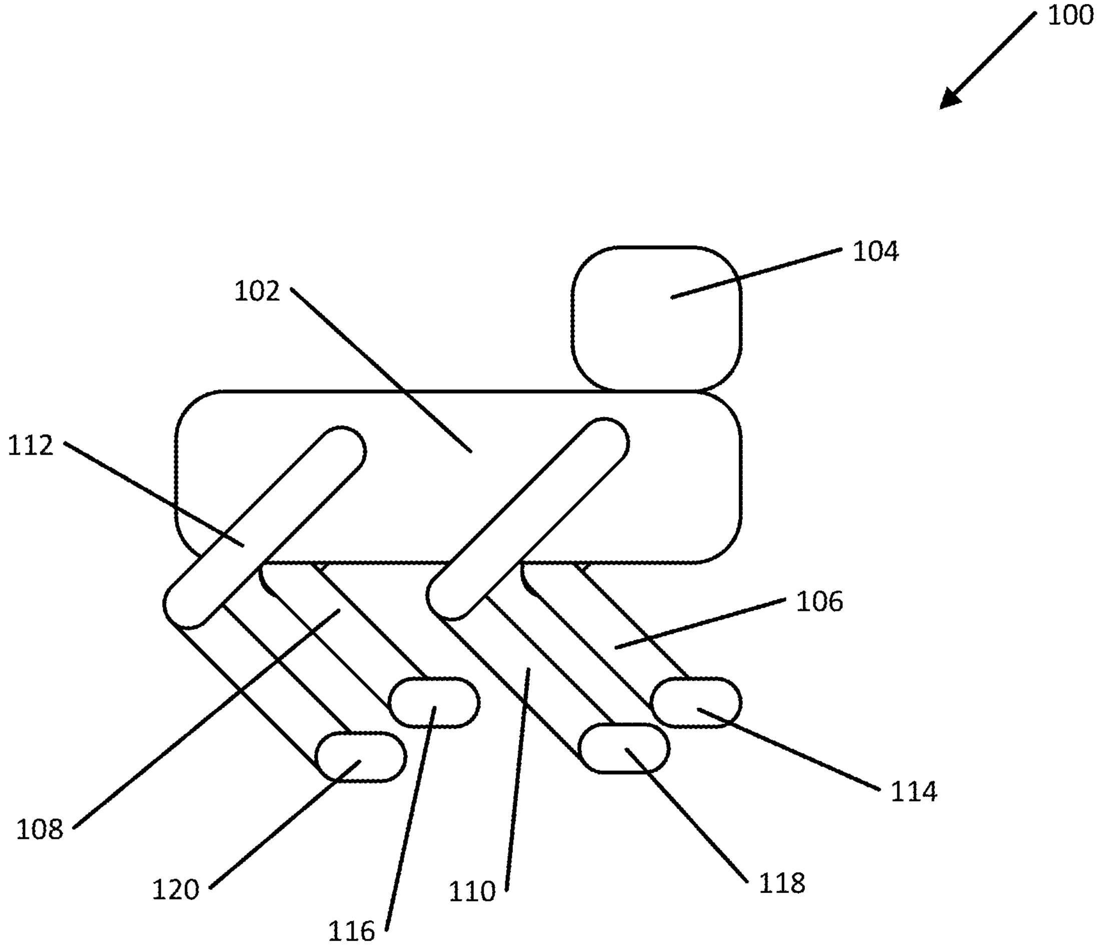
FIG. 1 illustrates an example of a robot in accordance with some implementations described herein.

Large language models (LLMs) have demonstrated the potential to perform high-level planning. However, it remains a challenge for some LLMs to comprehend low-level commands, such as joint angle targets or motor torques. Various implementations described herein use foot contact patterns as an interface that bridges human commands in natural language and a locomotion controller that outputs these low-level commands. In some implementations, the system allows users to flexibly craft diverse locomotion behaviors for robot(s) (e.g., quadrupedal robots). In some implementations, the system can include LLM prompt design, a reward function, and/or exposing the controller to a feasible distribution of contact patterns. The resulting controller is capable of achieving diverse locomotion patterns that can be transferred to real world robot hardware.

In some implementations, simple and/or effective interaction between a human user and a quadrupedal robot can pave the way towards creating intelligent and capable helper robots. Some human-robot interaction systems can enable quadrupedal robots to respond to natural language instructions as language is an important communication channel for human beings. Recent developments in Large Language Models (LLMs) have engendered a spectrum of applications fueled by the proficiency of LLMs to ingest an enormous amount of historical data, to adapt in-context to novel tasks with few examples, and to understand and interact with user intentions through a natural language interface.

LLMs have been used to develop interactive and capable systems for physical robots. Researchers have demonstrated the potential of using LLMs to perform high-level planning and/or robot code writing. Nevertheless, unlike text generation where LLMs directly interpret the atomic elements—tokens—it often proves challenging for LLMs to comprehend low-level robotic commands such as joint angle targets or motor torques, especially for inherently unstable legged robots necessitating high-frequency control signals. Consequently, many systems presume the provision of high-level APIs for LLMs to dictate robot behavior, which may inherently limit the system's expressive capabilities.

In some implementations, systems can use foot contact patterns as an interface that bridges human instructions in natural language and low-level commands. In some of those implementations, the resulting system for legged robots, particularly quadrupedal robots, can be interactive, where the system can allow users to craft diverse locomotion behaviors flexibly. Additionally or alternatively, the patterns of feet establishing and breaking contacts with the ground often govern the final locomotion behavior for legged robots due to the heavy reliance of quadruped locomotion on environmental contact. In some implementations, a contact pattern, describing the contact establishing and breaking timings for each leg, is a compact and flexible interface to author locomotion behaviors for legged robots. To leverage this interface for controlling quadruped robots, some implementations use an LLM-based approach to generate contact patterns, represented by '0's and '1's, from user instructions. Despite LLMs being trained with mostly natural language dataset, with proper prompting and in-context learning, the LLMs can produce contact patterns to represent diverse quadruped motions. In some implementations, a Deep Reinforcement Learning (DRL) based approach can be used to generate robot actions given a desired contact pattern. The DRL based approach can use a reward structure that only concerns about contact timing and exposing the policy to the right distribution of contact patterns. In some implementations, the system can include a controller capable of achieving diverse locomotion patterns that can be transferred to the real robot hardware.

In some implementations, the system can include an interface of contact pattern for harnessing knowledge from LLMs to flexibly and interactive control quadruped robots; a pipeline to teach LLMs to generate complex contact patterns from user instructions; and/or a DRL-based method to train a low-level controller that realizes diverse contact patterns on real quadruped robots.

In some implementations, the system can include using desired foot contact patterns as an interface between human commands in natural language and the locomotion controller. The locomotion controller can be used to not only complete the main task (e.g., following specified velocities), but also to place the robot's feet on the ground at the right time, such that the realized foot contact patterns are as close as possible to the desired ones. In some of those implementations, the locomotion controller can process the robot's proprioceptive sensor data, task commands (e.g., following a desired linear velocity), and/or the desired foot contact pattern to generate output indicating the desired joint positions. In some implementations, the foot contact patterns can be extracted by a cyclic sliding window from a pattern template, which is generated by a random pattern generator during training, and is translated from human commands in natural language by an LLM.

In some implementations, a desired foot contact pattern can be defined by a cyclic sliding window of size $L_w$ that extracts the four feet ground contact flags between t+1 and $t+L_w$ from a pattern template and is of shape $4 \times L_w$. A contact pattern template can be is a $4 \times T$ matrix of '0's and '1's. In some implementations, '0's can represent feet in the air and '1's can represent feet on the ground. Additionally or alternatively, from top to bottom, each row in the matrix gives the foot contact patterns of the front left (FL), front right (FR), rear left (RL) and rear right (RR) feet. In some implementations, the LLM can map human commands into foot contact pattern templates in specified formats accurately given properly designed prompts. In some of those implementations, the LLM can map human commands into foot contact pattern templates even when the commands are unstructured and/or vague. In some implementations, a random pattern generator can be used to produce contact pattern templates that are of various pattern lengths T, with foot-ground contact ratios within a cycle based on a given gait type G. In some of those implementations, the locomotion controller can be trained using a wide distribution of movements, which can enable the locomotion controller to generalize better.

While LLMs can learn knowledge from a vast amount of text data at training, providing proper prompts at inference can be the key to unlock and/or direct the acquired knowledge in meaningful ways. Carefully designed prompts can serve as the starting point for the models to generate text and guide the direction and context of the outputs. In some implementations, the system aims to enable the LLM to map any human commands in natural language to foot contact patterns in a specified format.

In some implementations, the LLM prompt can include one or more general instructions, one or more gait definitions, one or more foot contact pattern output instructions, one or more example foot contact patterns, one or more additional or alternative prompt portions, and/or combinations thereof. The one or more general instructions can include natural language text which describes the task the LLM should accomplish. In some implementations, the one or more general instructions can include a task where the LLM is expected to translate an arbitrary command (e.g., the NL text input) to a foot contact pattern. The one or more gait definitions can include natural language text which gives basic knowledge of quadrupedal gaits. Although their descriptions are neither exhaustive nor sufficiently accurate, the one or more gait definitions provide enough information for the LLM to follow the rules. Additionally or alternatively, the one or more gait definitions connects the bounding gait to a general impression of emotion. This helps the LLM generalize over vague human commands that do not explicitly specify what gaits the robot should use.

In some implementations, the LLM prompt can include an output definition which specifies the format of the output. For example, the system can discretize the desired velocities $$\widehat{v_x} \in \{-1, -0.5, 0, 0.5, 1\}\frac{\text{m}}{\text{s}}$$

so the LLM can give proper outputs corresponding to commands that contain words like "fast(er)" and/or "slow (er)".

In some implementations, the LLM prompt can include an examples block, which can include general knowledge of instruction fine-tuning and/or can provide the LLM with a few concrete input-output pairs. For example, the examples block can include one or more gait examples, one or more velocity examples, etc.

In some implementations, robot locomotion control can be represented as a Markov Decision Process (MDP). In some of those implementations, the MDP can be solved using DRL algorithms. For example, a MDP can be a tuple $(S, A, r, f, P_0, \gamma)$, where S is the state space, A is the action space, $r(s_t, a_t, s_{t+1})$ is the reward function, $f(s_t a_t)$ is the system transition function, $P_0$ is the distribution of initial states$s_0$, and $\gamma \in [0,1]$ is the reward discount factor. In some implementations, the goal of a DRL algorithm can be to optimize a policy $\pi: S \mapsto A$ so that the expected accumulated reward $$J = E_{s_0 \sim P_0}\left[\sum_t \gamma^t r(s_t, a_t, s_{t+1})\right]$$

is maximized. In some implementations, $a_t = \pi_\theta(s_t)$ and $\theta$ is the set of learnable parameters. In locomotion tasks, $s_t$ often includes sensory data and goal conditions (e.g., user specified velocity commands), and $a_t$ is desired joint angles or motor torques. In some implementations, $s_t$ can be expanded to include a desired foot contact pattern, and the controller needs to achieve the main task as well as realize the desired foot contact patterns.

In some implementations, the random pattern generator receives a gait type G, and can randomly sample a corresponding cycle length T and the ground contact ratio within the cycle for each foot, can conduct proper scaling and phase shifts, and/or can output a pattern template. While humans can give commands that map to a much wider set of foot contact pattern templates, as an example, the system can define and train on five types: G∈{BOUND, TROT, PACE, STAND_STILL, STAND_3LEGS}.

In some implementations, the system can use a feedforward neural network as the control policy $\pi_\theta$. The control policy can be used to generate the desired positions for each motor joint and its input includes the base's angular velocities, the gravity vector $\vec{g}=[0,0,-1]$ in the base's frame, user specified velocity, current joint positions and velocities, policy output from the last time step, desired foot contact patterns, and/or one or more additional or alternative parameters. In some implementations, Unitree A1 can be used as the quadrupedal robot. A1 has 3 joints per leg (i.e., hip, thigh and calf joints) and $L_w=5$, therefore the dimensions of the policy's input and output are 65 and 12, respectively. The policy has three hidden layers of sizes [512, 256, 128] with ELU ($\alpha$=1.0) at each hidden layer as the non-linear activation function.

To encourage natural and symmetric behaviors, the system can employ a double-pass trick in the control policy. Specifically, instead of using $a_t=\pi_\theta(s_t)$ directly as the output, the system can use $a_t=0.5[\pi_\theta(s_t)+f_{act}(\pi_\theta(f_{obs}(s_t))]$ where $f_{act}(\cdot)$ and $f_{obs}(\cdot)$ flips left-right the policy's output and the robot's state respectively. Intuitively, this double-pass trick says the control policy should output consistently when it receives the original and the left-right mirrored states. In practice, this trick greatly improves the naturalness of the robot's movement and helps shrink the sim-to-real gap.

One of the controller's main tasks is to follow user specified linear velocities along the robot's heading direction, while keeping the linear velocity along the lateral direction and the yaw angular velocity as close to zeros as possible. Additionally or alternatively, the controller needs to plan for the correct timing for feet-ground strikes so that the realized foot contact patterns match the desired ones. For real world deployment, the system can use a regularization term that penalizes action changing rate so that the real robot's movement is smoother. In addition to applying domain randomization, extra reward terms that keep the robot base stable can greatly shrink the sim-to-real gap and produce natural looking gaits. Finally, although no heavy engineering is required to train the locomotion policy with extra contact pattern inputs, it can help to balance the ratio of the gait types during training.

In some implementations, the random pattern generator can generate a foot contact pattern given a specific gait G. As an illustrated example, the system can generate a foot contact pattern for G=PACING. In general, the system can sample T∈[24, 28]. When the control frequency is 50 Hz, the corresponding cycle length is 0.48~0.56 seconds. The system can sample a foot-ground contact length ratio within the cycle $r_{contact}\in[0.5, 0.7]$, where the foot-ground contact length ratio $Tr_{contact}$ can indicate the number of '1's and $T(1-r_{contact})$ can indicate the number of '0's in each row. In some implementations, the system needs to scale the length and/or shift bits of these ones and zeroes to produce feasible foot contact patterns on a real robot.

For example, for G=BOUND, the foot-ground contact time can be shortened to 60% of the sampled value (i.e., $r_{contact}=0.6r_{contact}$). Similarly, the ones can be placed at the beginning of the FL and FR rows, and the ones in the RL and RR rows can be shifted by $0.5Tr_{contact}$ bits to the right. In contrast, for G=TROT, the system does not perform any scaling. Additionally or alternatively, the '1's can be shifted to form a complete foot contact pattern, where the ones are placed at the beginning of FL and RR and at the end of the FR and RL rows. In some implementations, $r_{contact}$ is not changed for G=PACE, but the cycle lengths can be shortened to half of its sampled value (i.e., T=0.5T) to make the gait natural and/or feasible. The system can still place the ones at the beginning in the FL and RL rows and at the end of the FR and RR rows.

For G={STAND_STILL, STAND_3LEGS}, the system performs no scaling and fills the foot contact pattern matrix with ones. Additionally, for G=STAND_3LEGS, the system can randomly sample one row and replace it with zeroes.

In some implementations, the reward can consist of a set of weighted reward terms (e.g., 9 weighted reward terms):

$$J=\sum_{i=1}^{8}$$

$w_i r_i$, where the $w_i$'s are the weights and $r_i$'s are the rewards. In some implementations, the definition of one or more of the reward terms and the value of the weights are described as follows, where the purpose of each reward term is in brackets.

(1) A linear velocity tracked reward [task reward] of $$r_1=e^{-4\times((v_x-\hat{v}_x)^2+v_y^2)},$$

where $v_x$ and $\hat{v}_x$ are the current and desired linear velocities along the robot's heading direction, and $v_y$ is the current linear velocity along the lateral direction. In some implementations, all velocities are in the base frame, and $w_1=1$.

(2) An angular velocity tracking reward [task reward] of $$r_2=e^{-4\times\omega_z^2},$$

where $\omega_z$ is the current angular yaw velocity in the base frame and $w_2=-0.5$.

(3) A penalty on foot contact pattern violations [task reward] of $$r_3=\frac{1}{4}\sum_{i=1}^{4}|c_i-\hat{c}_i|,$$

where $c_i, \hat{c}_i\in\{0,1\}$ are the realized and desired foot-ground contact indicators for the i-th foot, and $w_3=-1$.

(4) A regularization on action rate [sim-to-real] of $$r_4=\sum_{i=1}^{12}(a_t-a_{t-1})^2,$$

where $a_t$ and $a_{t-1}$ are the controller's output at the current and the previous time steps, and $w_4=-0.005$.

(5) A penalty on roll and pitch angular velocities [sim-to-real]. In some implementations, the system encourage the robot's base to be stable during motion, hence $$r_5 = \omega_x^2 + \omega_y^2,$$

where $\omega_x$ and $\omega_y$ are the current roll and pitch angular velocities in the base frame, and $w_5$=–0/05. In some of those implementations, the penalty does not apply to G=BOUND.

(6) A penalty on linear velocity along the z-axis [sim-to-real]. In some implementations, the system encourages base stability during motion, hence of $$r_6 = v_z^2,$$

where $v_z$ is the current linear velocity along the z-axis in the base frame, and $w_6$=–2. In some of those implementations, the penalty does not apply to G=BOUND (7) A penalty on body collision [natural motion] of $$r_7 = \sum_{i=1}^{K}$$

$1\{F_i>0.1\}$, where $F_i$ is the contact force on the i-th body. In some implementations, K=8 (i.e., 4 thighs and 4 calves) and $w_7$=–1.

(8) A penalty on deviation from the default pose [natural motion] of $r_8=\Sigma_{a_t \in hip} |a_t|$, where $a_t$'s are the actions (i.e., deviation from the default joint position) applied to the hip joints, and $w_8$=–0.03.

In some implementations, the control policy of the locomotion controller can be trained using the following training configurations. In some implementations, PD control can be used to convert positions to torques in the system. The base value for the 2 gains are $k_p$=20 and $k_d$=0.5, and the control frequency is 50 Hz. In some implementations, a gait G can be sampled based on a randomly assigned gait to a robot at environment resets. Additionally or alternatively, the system can also sample the gait again every 150 steps in simulation. Of the 5 gait types described herein, some gaits are harder to learn than others. To avoid the case where the hard-to-learn gaits die out, leaving the controller to learn only the easier gaits, the system can restrict the sampling distribution such that the ratio of the gait types are approximately the same.

In some implementations, the system can use proximal policy optimization (PPO) as the reinforcement learning method to train the controller. In some of those implementations, PPO can be used to train an actor-critic policy. The actor policy can use a feed-forward neural network as the actor policy $\pi_\theta$. The actor policy can be used to generate the desired positions for each motor joint and its input includes the base's angular velocities, the gravity vector $\vec{g}$=[0,0,–1] in the base's frame, user specified velocity, current joint positions and velocities, policy output from the last time step, desired foot contact patterns, and/or one or more additional or alternative parameters. In some implementations, Unitree A1 can be used as the quadrupedal robot. A1 has 3 joints per leg (i.e., hip, thigh and calf joints) and $L_w$=5, therefore the dimensions of the policy's input and output are 65 and 12, respectively. The policy has three hidden layers of sizes [512, 256, 128] with ELU ($\alpha$=1.0) at each hidden layer as the non-linear activation function.

In some implementations, the system critic policy can use a similar network architecture as the actor policy, except the output size is 1 (instead of 12) and it can receive the base velocities in the local frame as its input. The system can keep the hyper-parameters the same and train for 1000 iterations. For safety reasons, the system can end an episode early if the body height of the robot is lower than 0.25 meters.

In some implementations, during training the system can sample noise $\epsilon$~Unif, and can add them to the controller's observations. The system can use PD control to convert positions to torques, and domain randomization can be applied to the 2 gains $k_p$ and $k_d$.

Turning now to the figures, FIG. 1 illustrates an example mobile robot 100 in accordance with some implementations described herein. However, additional and/or alternative robots can be utilized with techniques disclosed herein, such as additional robots that vary in one or more respects from robot 100 illustrated in FIG. 1. For example, a mobile forklift robot, an unmanned aerial vehicle ("UAV"), a non-mobile robot, and/or a humanoid robot can be utilized instead of or in addition to robot 100, in techniques described herein.

Robot 100 includes a base 102, a head 104, front left leg 106, back left leg 108, front right leg 110, and rear right leg 112, where the legs are provided for locomotion of the robot. The front left leg 106 has a corresponding foot 114; the back left leg 108 has a corresponding foot 116; the front right leg 110 has a corresponding foot 118; and the rear right leg 112 has a corresponding foot 120. The robot 100 may include, for example, one or more motors to move one or more legs of the robot 100 to achieve a desired direction, velocity, and/or acceleration of movement for the robot 100. Additional or alternative robots can include one or more robot arms (not depicted) with an end effector (not depicted) that takes the form of a gripper with two opposing "fingers" or "digits."

Robot 100 also includes one or more vision components (not depicted) that can generate vision data (e.g., images) related to shape, color, depth, and/or other features of object(s) that are in the line of sight of the vision component (s). The vision component(s) can be, for example, a monocular camera, a stereographic camera (active or passive), and/or a 3D laser scanner. A 3D laser scanner can include one or more lasers that emit light and one or more sensors that collect data related to reflections of the emitted light. The 3D laser scanner can generate vision component data that is a 3D point cloud with each of the points of the 3D point cloud defining a position of a point of a surface in 3D space. A monocular camera can include a single sensor (e.g., a charge-coupled device (CCD)), and generate, based on physical properties sensed by the sensor, images that each includes a plurality of data points defining color values and/or grayscale values. For instance, the monocular camera can generate images that include red, blue, and/or green channels. Each channel can define a value for each of a plurality of pixels of the image such as a value from 0 to 255 for each of the pixels of the image. A stereographic camera can include two or more sensors, each at a different vantage point. In some of those implementations, the stereographic camera generates, based on characteristics sensed by the two sensors, images that each includes a plurality of data points defining depth values and color values and/or grayscale values. For example, the stereographic camera can generate images that include a depth channel and red, blue, and/or green channels.

Robot 100 also includes one or more processors that, for example, can implement all or aspects of process 700 and/or 800 described herein. Additional description of some examples of the structure and functionality of various robots is provided herein.

At a given time, one or more of the feet (e.g., 114, 116, 118, 120) of the robot can make contact with a surface in the environment of the robot. For example, one or more feet of the robot, at a given time, can make contact with the ground, a step, a wall, an object in the environment, one or more additional or alternative surfaces, and/or combinations thereof.

Figure 2A:
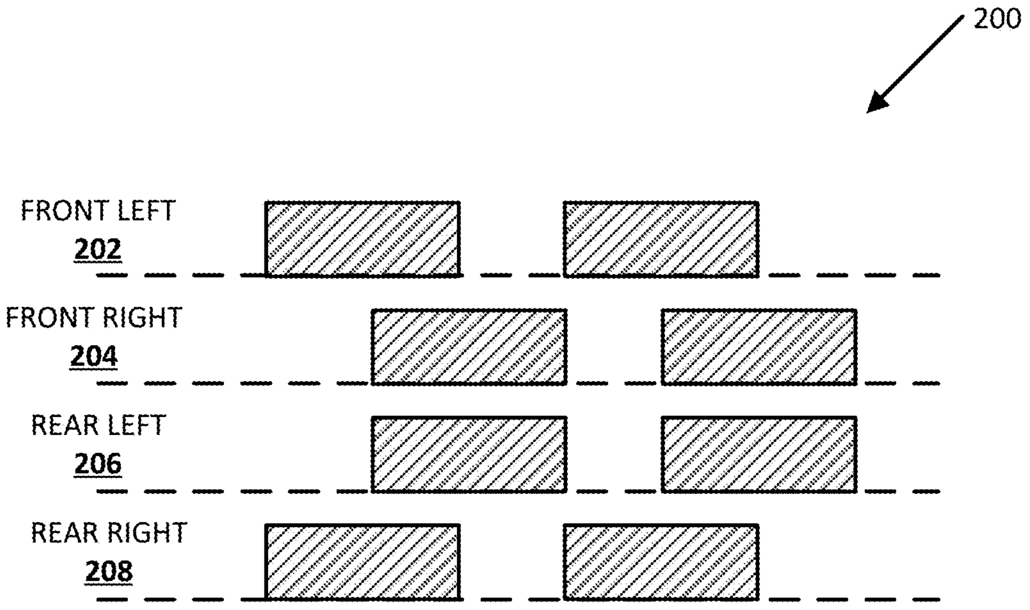
FIG. 2A illustrates an example foot contact pattern for a quadruped robot, where the foot contact pattern corresponds with trotting in accordance with some implementations described herein.

FIG. 2A illustrates an example foot contact pattern 200 in accordance with some implementations. The example foot contact pattern 200 represents a quadruped robot (e.g., robot 100 of FIG. 1) moving with a trotting gait. In some implementations, the robot is trotting based on processing natural language text input of "trot forward slowly". For each of the legs of the robot, the foot contact pattern includes a representation of when the foot makes contact with the ground and when the foot does not make contact with the ground over time. The foot contact pattern 200 includes a portion corresponding to the front left leg 202, the front right leg 204, the rear left leg 206, and the rear right leg 208. In the illustrated example, periods of time where the corresponding leg makes contact with the surface is indicated by diagonal shading.

Figure 2B:
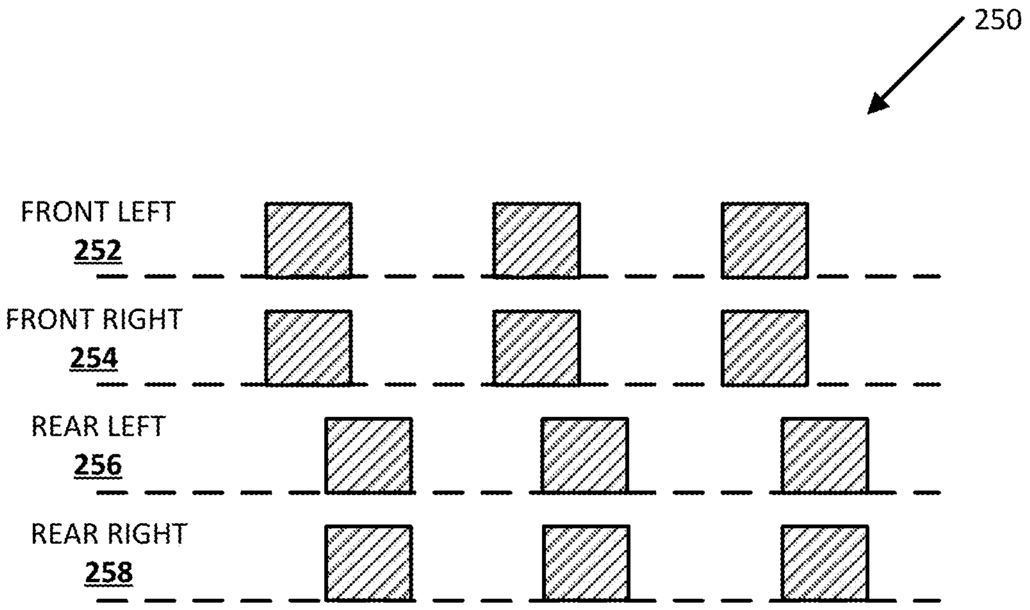
FIG. 2B illustrates another example foot contact for a quadruped robot, where the foot contact pattern corresponds with bounding in accordance with some implementations described herein.

Similarly, FIG. 2B illustrates another example foot contact pattern 250 of a quadruped robot (e.g., robot 100 of FIG. 1) moving with a bounding gait. In some implementations, the robot is bounding based on processing natural language text input of "good news, we are going to a picnic this weekend!". As described above with respect to FIG. 2A, for each of the legs of the robot, the foot contact pattern 250 includes a representation of when the foot makes contact with the ground and when the foot does not make contact with the ground. The foot contact pattern 250 includes a portion corresponding to the front left leg 252, the front right leg 254, the rear left leg 256, and the rear right leg 258. In the illustrated example, periods of time where the corresponding leg makes contact with the surface is indicated by diagonal shading.

FIGS. 3A-3C illustrate example foot contact patterns generated using the LLM in accordance with some implementations, where a leg making contact with the ground (e.g., the surface) is represented by '1' and where the leg does not make contact with the ground is represented by '0'. FIG. 3A illustrates a foot contact pattern 300 representing a bounding gait of the robot over time. FIG. 3B illustrates a foot contact pattern 330 representing a trotting gait over time. FIG. 3C illustrates a pacing foot contact pattern 360 over time.

FIG. 4 illustrates example LLM prompts in accordance with various implementations. In the illustrated example 400, the LLM prompts can be divided into categories including <general instruction block> 402, <gait definition block> 404, <output format definition block 406>, <examples block> 408, one or more additional or alternative block types (not depicted), and/or combinations thereof. The <general instruction block> 402 describes the task the LLM should accomplish, such as the task of translating a natural language text command to a foot contact pattern. For example, the <general instruction block> 402 can include one or more task descriptions of "You are a dog foot contact pattern expert"; "Your job is to give a velocity and a foot contact pattern based on the input"; "You will always give the output in the correct format no matter what the input is"; one or more additional or alternative task description; and/or combinations thereof.

The <gait definition block> 404 can include basic knowledge of one or more quadrupedal gaits. In some implementations, the gait definitions can connect the bounding gait to a general impression of emotion, which helps the LLM generalize over vague human commands (that may not explicitly specify what gaits the robot should use). For example, <gait definition block> 404 can include: "1. Trotting is a gait where two diagonally opposite legs strike the ground at the same time."; "2. Pacing is a gait where the two legs on the left/right side of the body strike the ground at the same time."; "3. Bounding is a gait where the two front/rear legs strike the ground at the same time. It has a longer suspension phase where all feet are off the ground, for example, for at least 25% of the cycle length. This gait also gives a happy feeling."; one or more additional or alternative descriptions of quadrupedal gaits; and/or combinations thereof.

The <output format definition block> 406 can specify the format of the output. In some implementations, the desired velocities can be discretized as $$\hat{v}_x \in \{-1, -0.5, 0, 0.5, 1\}\frac{m}{s}$$

so the LLM can give outputs corresponding to words like "fast(er)" and "slow(er)". For example, <output format definition block> 406 can include "The following are rules for describing the velocity and foot contact patterns:"; "1. You should first output the velocity, then the foot contact pattern."; "2. There are five velocities to choose from: [−1.0, −0.5, 0.0, 0.5, 1.0]."; "3. A pattern has 4 lines, each of which represents the foot contact pattern of a leg."; "4. Each line has a label. "FL" is the front left leg, "FR" is the front right leg, "RL" is the rear left leg, and "RR" is the rear right leg."; "5. In each line, "0" represents the foot in the air, "1" represents the foot on the ground."; one or more additional or alternative output format definitions; and/or combinations thereof.

The <examples block> 408 can include general knowledge of instruction fine-tuning and/or can show the LLM a few concrete input-output pairs. In some implementations, the LLM can generalize and handle various commands, including those which vaguely state what velocity or gait the robot should use, based on a small number of gait examples (e.g., 3 gait examples, 5 gait examples, 10 gait examples, etc.). For example, the <examples block> 408 can include an example corresponding to the input "trot slowly", the input "bound in place", and the input "pace backward fast".

Figure 5:
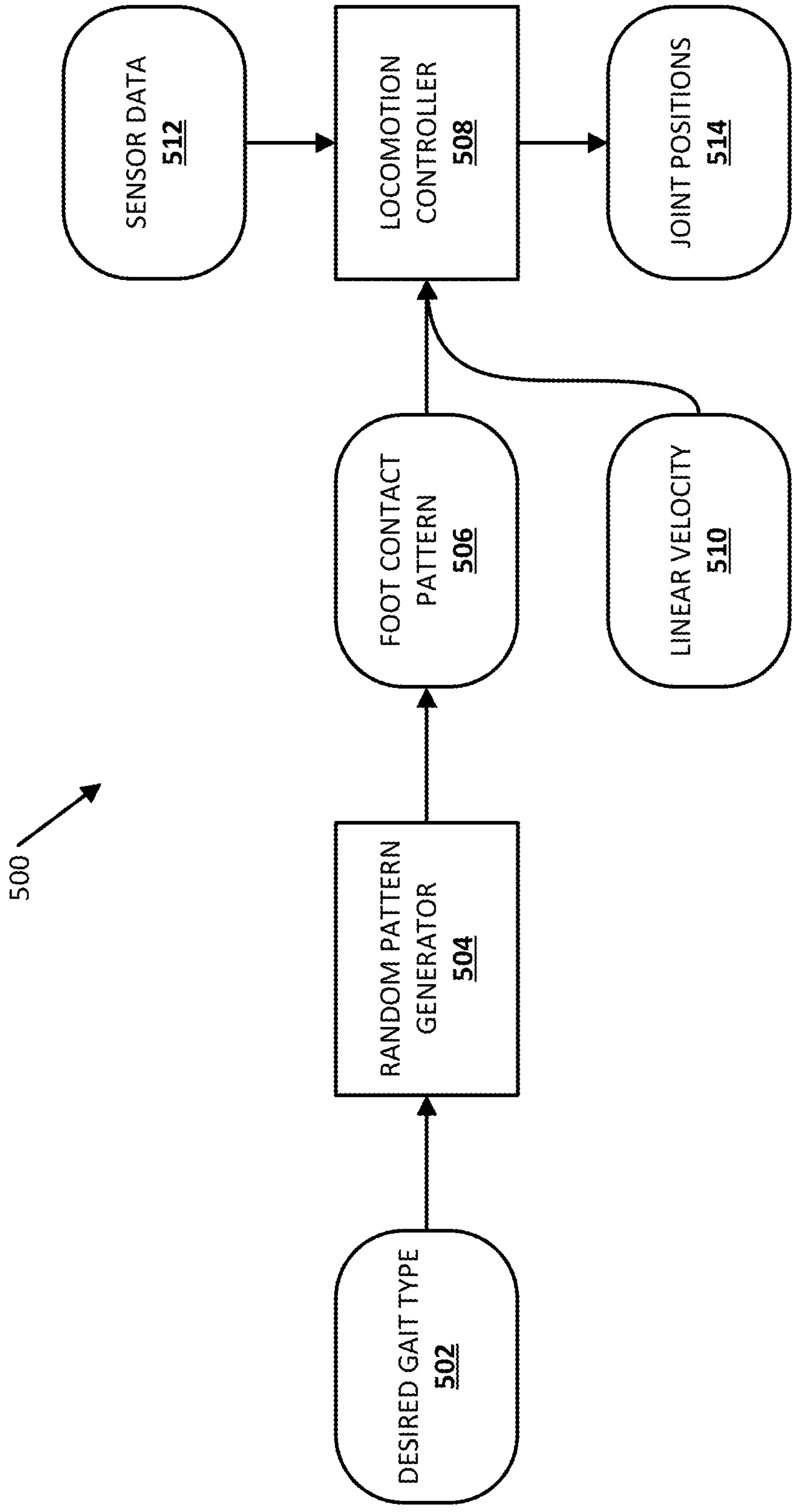
FIG. 5 is a block diagram illustrating an example of training a locomotion controller in accordance with some implementations.

FIG. 5 is a block diagram illustrating an example 500 of training a control policy of a locomotion controller in accordance with various implementations. In some implementations, the system can select a desired gait type 502. For example, the system can define and train the control policy on five types: G∈{BOUND, TROT, PACE, STAND_STILL, STAND_3LEGS}. The random pattern generator 504 can process the desired gait type 502 to output a foot contact pattern 506. In some implementations, the random pattern generator 504 samples a pattern length T and/or the ground contact length within the cycle for each of the feet. Additionally or alternatively, the random pattern generator 504 can perform scaling and/or phase shifting to the foot contact pattern 506 as needed. As described above, the random pattern generator 504 can sample a foot contact pattern of length T, sample a contact ratio $r_{contact}$, scale T or $r_{contact}$ as needed, and shift the bits based on the selected gait.

In some implementations, a control policy of the locomotion controller 508 can generate one or more joint positions 514 (e.g., one or more low-level commands for the robot) based on process the foot contact pattern 506, a linear velocity 510, one or more instances of sensor data 512 describing the current position of the robot, one or more additional or alternative value, and/or combinations thereof. In some implementations, the linear velocity 510 can be randomly selected by a user. Additionally or alternatively, the linear velocity can be sampled by the system and/or by the random pattern generator 504. In some implementations, the system can generate a sequence of robot states and a corresponding sequence of robot actions based on processing the foot contact pattern 506 using the control policy. In some of those implementations, the system can generate a reward based on the sequence of robot states and corresponding robot actions. One or more portions of the control policy can be updated based on the reward using reinforcement learning. For example, the system can update one or more portions of the control policy based on the determined reward in accordance with process 700 described herein with respect to FIG. 7.

Figure 6:
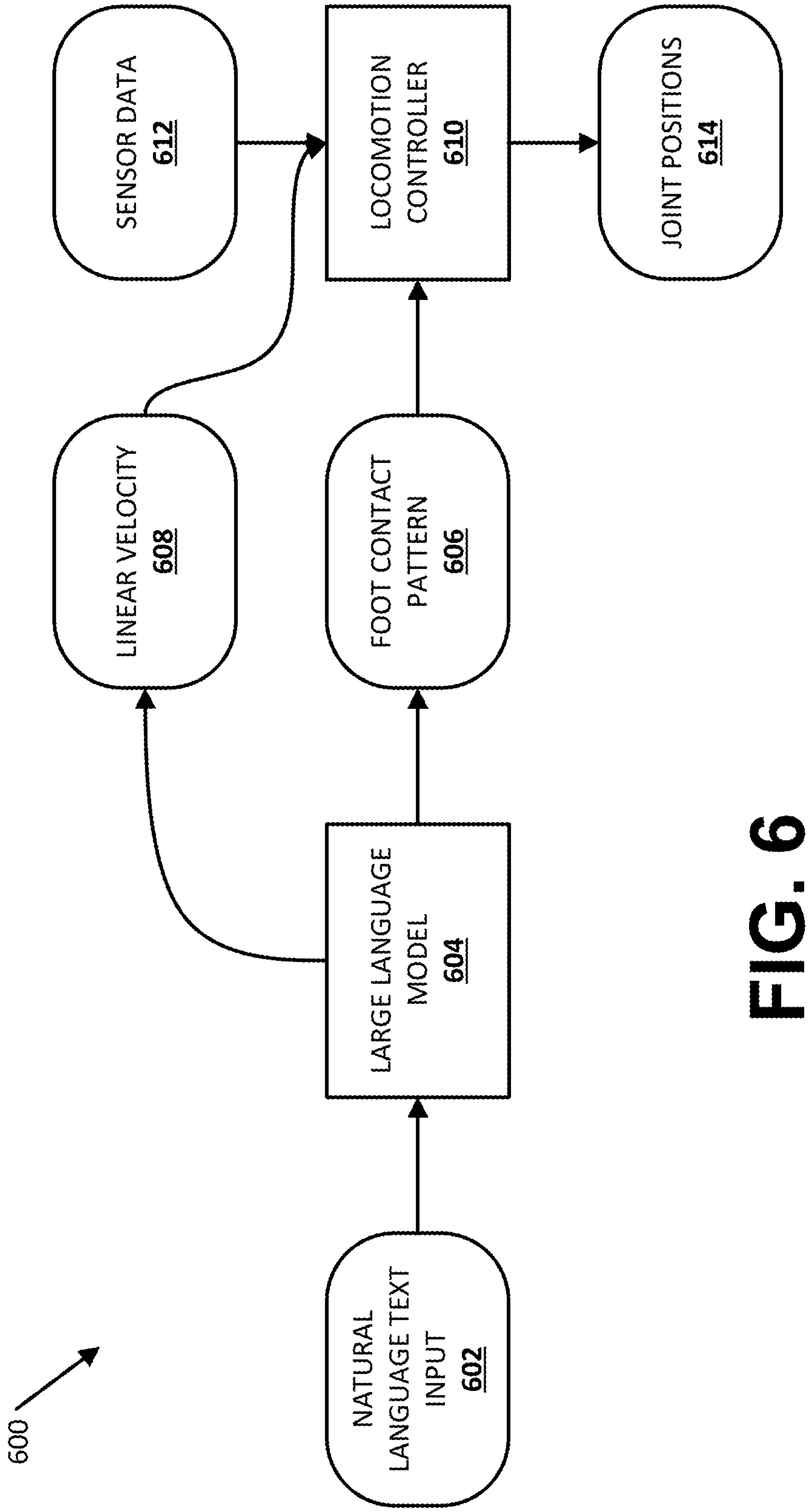
FIG. 6 is a block diagram illustrating an example of controlling a robot based on natural language text input in accordance with some implementations.

FIG. 6 is a block diagram illustrating an example 600 of generating one or more robot joint positions 614 based on a foot contact pattern 606 in accordance with various implementations. In some implementations, the system can receive natural language (NL) text input 602 from a user. For example, the system can receive NL text input 602 of "Go catch that squirrel on the tree". NL text input 602 can include a text representation of an utterance spoken by the user (e.g., a text representation of a spoken utterance captured in one or more instances of audio data). Additionally or alternatively, NL text input 602 can include text captured via one or more user interface input devices (e.g., a keyboard, a touchpad, etc.). In some implementations the NL text input 602 can be generated based on processing data not directly provided by the user. For example, the system can process one or more frames of a video to generate a text description of a desired foot contact pattern based on movement and/or audio captured in the video.

In some implementations, the system can process the NL text input 602 using LLM 604 to generate a foot contact pattern 606. For example, the system can process a LLM prompt 400 as described herein with respect to FIG. 4 using the LLM 604.

In some implementations, a linear velocity 608 can be provided, where the linear velocity is a target velocity for the robot to maintain while performing the locomotion task. In some implementations, the user can provide a linear velocity 608 (not depicted). In some other implementations, the LLM 604 can generate the linear velocity 608 in addition to the foot contact pattern 606 based on processing the NL text input 602.

In some implementations a locomotion controller 610 (e.g., a control policy of the locomotion controller) can generate one or more joint positions 614 which can be used to control the robot based on processing the foot contact pattern 606, the linear velocity 608, and/or one or more instances of sensor data 612. For example, the system can generate the one or more joint positions 614 in accordance with process 800 of FIG. 8 described herein.

Figure 7:
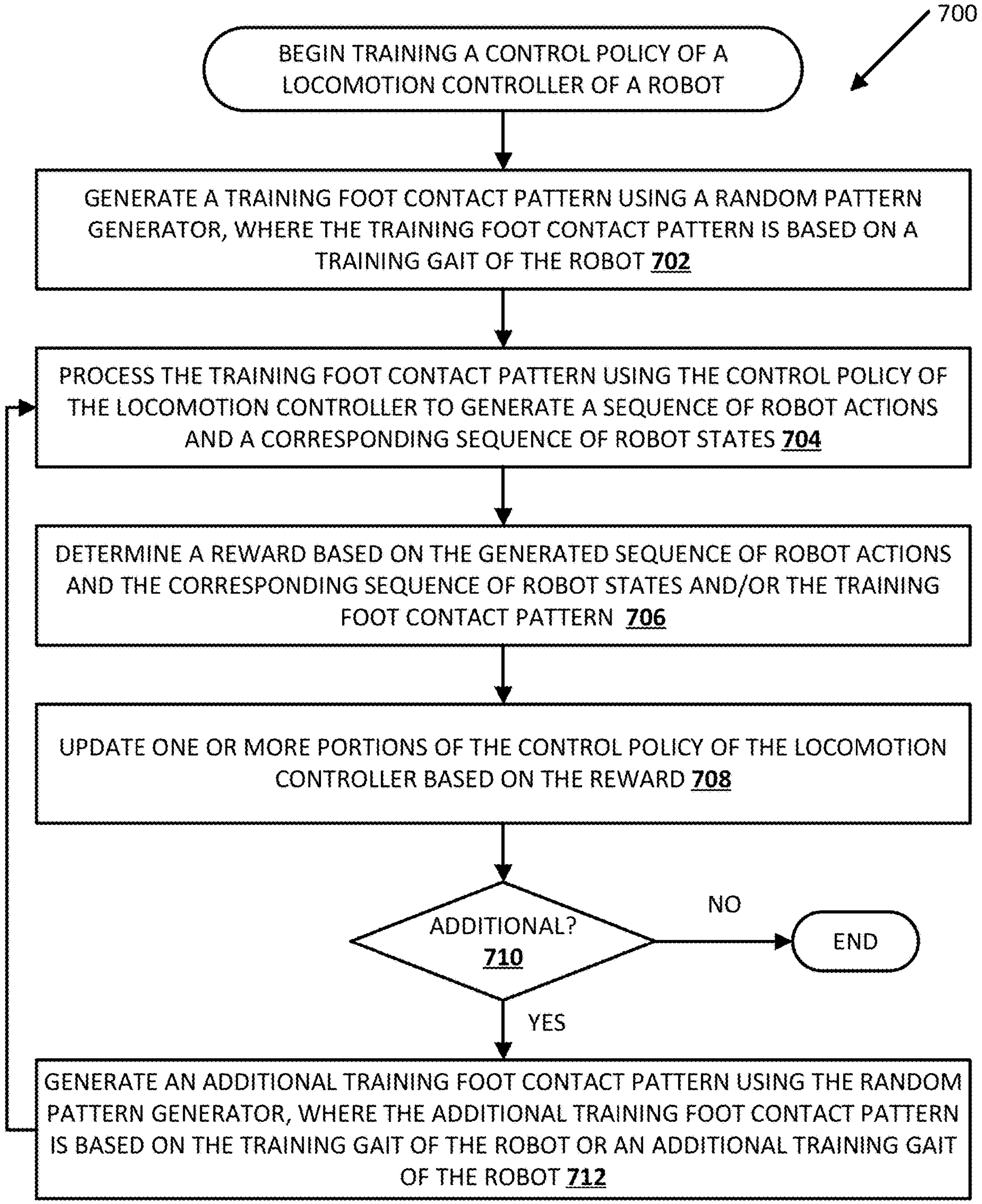
FIG. 7 is a flowchart illustrating an example process of training a locomotion controller in accordance with some implementations.

FIG. 7 is a flowchart illustrating an example process 700 of training a control policy of a locomotion controller in accordance with various implementations described herein. For convenience, the operations of the process 700 are described with reference to a system that performs the operations. This system can include one or more components of a robot, such as a robot processor and/or robot control system of robot 100, robot 920, and/or other robot and/or can include one or more components of a computer system, such as computer system 1010. Moreover, while operations of process 700 are shown in a particular order, this is not meant to be limiting. One or more operations can be reordered, omitted and/or added.

At block 702, the system generates a training foot contact pattern using a random pattern generator. In some implementations, the system can generate the training foot contact pattern based on a training gait. In some implementations, the random pattern generator can generate a foot contact pattern given a specific gait G. As an illustrated example, the system can generate a foot contact pattern for G=PACING. In general, the system can sample $T \in [24, 28]$. When the control frequency is 50 Hz, the corresponding cycle length is 0.48~0.56 seconds. The system can sample a foot-ground contact length ratio within the cycle $r_{contact} \in [0.5, 0.7]$, where the foot-ground contact length ratio $Tr_{contact}$ can indicate the number of '1's and $T(1-r_{contact})$ can indicate the number of '0's in each row. In some implementations, the system needs to scale the length and/or shift bits of these ones and zeroes to produce feasible foot contact patterns on a real robot.

For example, for G=BOUND, the foot-ground contact time can be shortened to 60% of the sampled value (i.e., $r_{contact}=0.6r_{contact}$). Similarly, the ones can be placed at the beginning of the FL and FR rows, and the ones in the RL and RR rows can be shifted by $0.5Tr_{contact}$ bits to the right. In contrast, for G=TROT, the system does not perform any scaling. Additionally or alternatively, the '1's can be shifted to form a complete foot contact pattern, where the ones are placed at the beginning of FL and RR and at the end of the FR and RL rows. In some implementations, $r_{contact}$ is not changed for G=PACE, but the cycle lengths can be shortened to half of its sampled value (i.e., T=0.5T) to make the gait natural and/or feasible. The system can still place the ones at the beginning in the FL and RL rows and at the end of the FR and RR rows. For G={STAND_STILL, STAND_3LEGS}, the system performs no scaling and fills the foot contact pattern matrix with ones. Additionally, for G=STAND_3LEGS, the system can randomly sample one row and replace it with zeroes.

At block 704, the system processes the training foot contact pattern using the control policy of the locomotion controller to generate a sequence of robot actions and a corresponding sequence of robot states. In some implementations, the system processes a linear velocity and/or one or more instances of sensor data indicating the position of the robot with the training foot contact pattern using the control policy of the locomotion controller to generate the sequence of robot actions and corresponding sequence of robot states.

At block 706, the system determines a reward based on the generated sequence of robot actions and the corresponding sequence of robot states and/or the training foot contact pattern.

At block 708, the system updates one or more portions of the control policy of the locomotion controller based on the reward.

At block 710, the system determines whether to process any additional training foot contact patterns. In some implementations, the system can determine whether to process any additional training foot contact patterns based on whether there are any remaining unprocessed training foot contact patterns, whether a threshold number of foot contact patterns have been processed, whether a threshold duration of time has been spent training the control policy, based on one or more additional or alternative metrics, and/or combinations thereof. If the system determines to process one or more additional foot contact patterns, the system generates an additional training foot contact pattern at block 712 before proceeding back to blocks 704, 706, and 708. If not, the process ends.

At block 712, the system generates an additional training foot contact pattern using the random pattern generator. In some implementations, the additional training foot contact pattern can be based on the training gait of the robot or an additional training gait of the robot.

Figure 8:
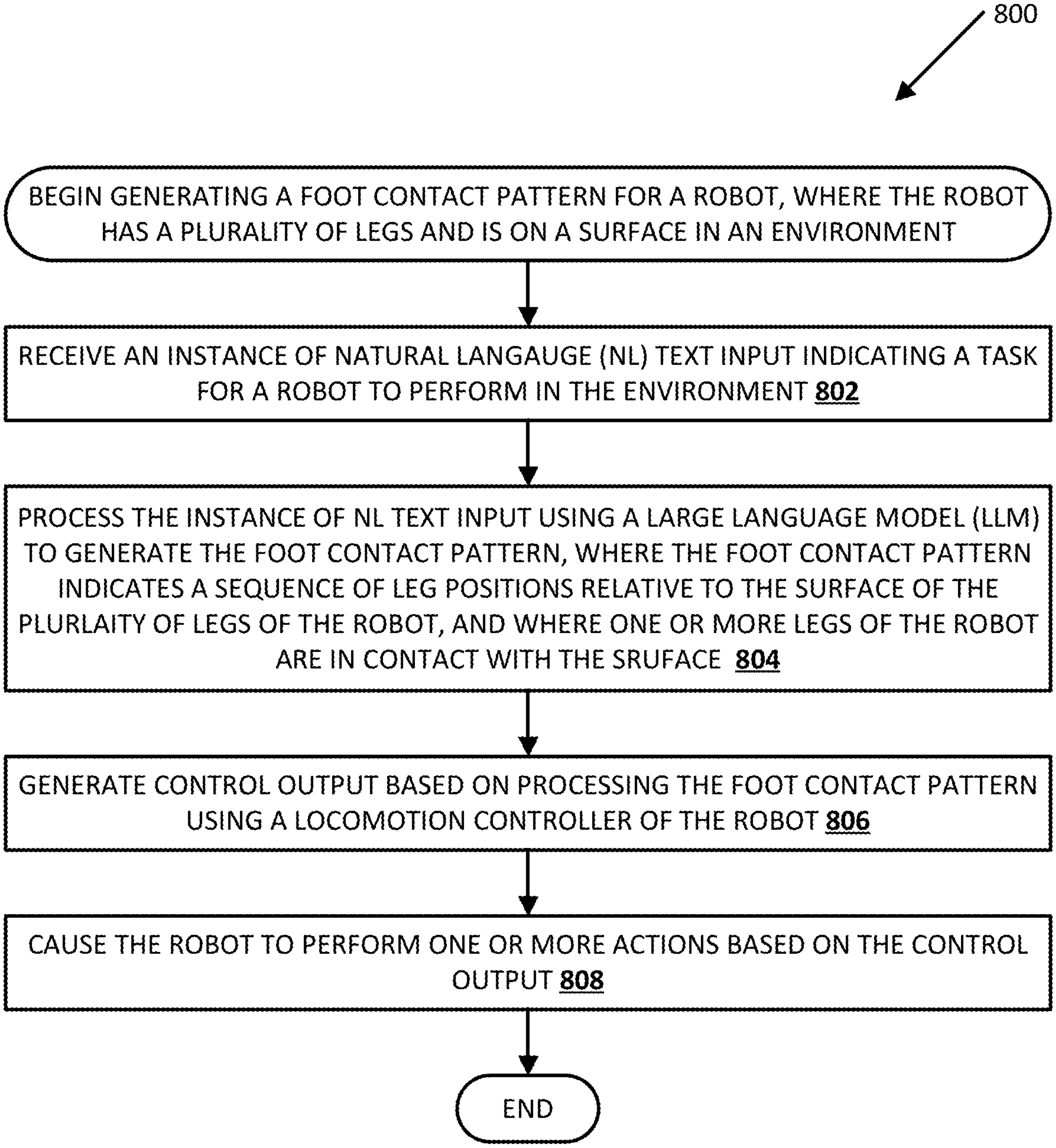
FIG. 8 is a flowchart illustrating an example process of generating a foot contact pattern using a LLM for controlling a robot in accordance with some implementations.

FIG. 8 is a flowchart illustrating an example process 800 of controlling a robot in accordance with various implementations described herein. For convenience, the operations of the process 800 are described with reference to a system that performs the operations. This system can include one or more components of a robot, such as a robot processor and/or robot control system of robot 100, robot 920, and/or other robot and/or can include one or more components of a computer system, such as computer system 1010. Moreover, while operations of process 700 are shown in a particular order, this is not meant to be limiting. One or more operations can be reordered, omitted and/or added.

At block 802, the system receives an instance of natural language (NL) text input indicating a task for a robot to perform in the environment. For example, a user can provide NL text input of "Good news, we are going to a picnic!"; bound forward slowly"; "raise your right front leg"; "act as if the ground is very hot"; one or more additional or alternative instances of NL text input; and/or combinations thereof.

At block 804, the system processes the instance of NL text input using a LLM to generate a foot contact pattern. In some implementations, the foot contact pattern indicates a sequence of leg positions relative to the surface of the plurality of legs of the robot. In some of those implementations, one or more legs of the robot are in contact with the surface. In some implementations, the prompt provided to the LLM can include one or more general instructions, one or more gait definitions, one or more output format definitions, one or more foot contact pattern examples, one or more additional or alternative instances of text description, and/or combinations thereof. In some implementations, the LLM prompt is described herein with respect to FIG. 4.

At block 806, the system generates control output based on processing the foot contact pattern using a locomotion controller of the robot. In some implementations, the system can process the foot contact pattern, one or more instances of sensor data identifying the current pose of the robot, and/or a linear velocity (e.g., a user provided linear velocity) using a control policy of the locomotion controller to generate control output. In some implementations, the control output can include one or more low-level commands to control the joint positions and/or motor angles of the robot.

At block 808, the system causes the robot to perform one or more actions based on the control output. For instance, the system can cause the robot to perform a locomotion task in accordance with the NL text input provided at block 802.

Figure 9:
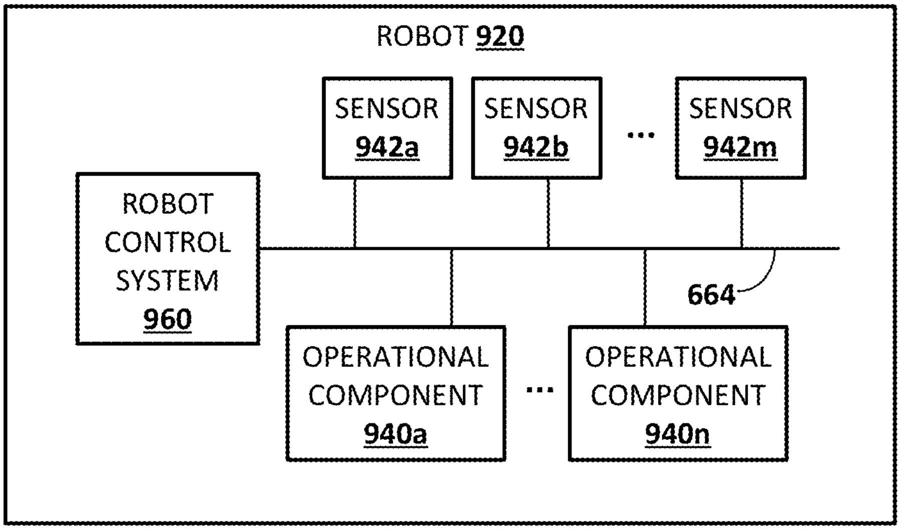
FIG. 9 schematically depicts an example architecture of a robot.

FIG. 9 schematically depicts an example architecture of a robot 920. The robot 920 includes a robot control system 960, one or more operational components 940*a*-940*n*, and one or more sensors 942*a*-942*m*. The sensors 942*a*-942*m* may include, for example, vision sensors, light sensors, pressure sensors, pressure wave sensors (e.g., microphones), proximity sensors, accelerometers, gyroscopes, thermometers, barometers, and so forth. While sensors 942*a-m* are depicted as being integral with robot 920, this is not meant to be limiting. In some implementations, sensors 942*a-m* may be located external to robot 920, e.g., as standalone units.

Operational components 940*a*-940*n* may include, for example, one or more end effectors and/or one or more servo motors or other actuators to effectuate movement of one or more components of the robot. For example, the robot 920 may have multiple degrees of freedom and each of the actuators may control the actuation of the robot 920 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 960 may be implemented in one or more processors, such as a CPU, GPU, and/or other controller(s) of the robot 920. In some implementations, the robot 920 may comprise a "brain box" that may include all or aspects of the control system 960. For example, the brain box may provide real time bursts of data to the operational components 940*a-n*, with each of the real time bursts comprising a set of one or more control commands that dictate, inter alia, the parameters of motion (if any) for each of one or more of the operational components 940*a-n*. In some implementations, the robot control system 960 may perform one or more aspects of method(s) described herein, such as process 700 of FIG. 7 and/or process 800 of FIG. 8.

As described herein, in some implementations all or aspects of the control commands generated by control system 960, in controlling a robot during performance of a robotic task, can be generated based on robotic skill(s) determined to be relevant for the robotic task and, optionally, based on determined map location(s) for environmental object(s). Although control system 960 is illustrated in FIG. 9 as an integral part of the robot 920, in some implementations, all or aspects of the control system 960 may be implemented in a component that is separate from, but in communication with, robot 920. For example, all or aspects of control system 960 may be implemented on one or more computing devices that are in wired and/or wireless communication with the robot 920, such as computing device 1010.

Figure 10:
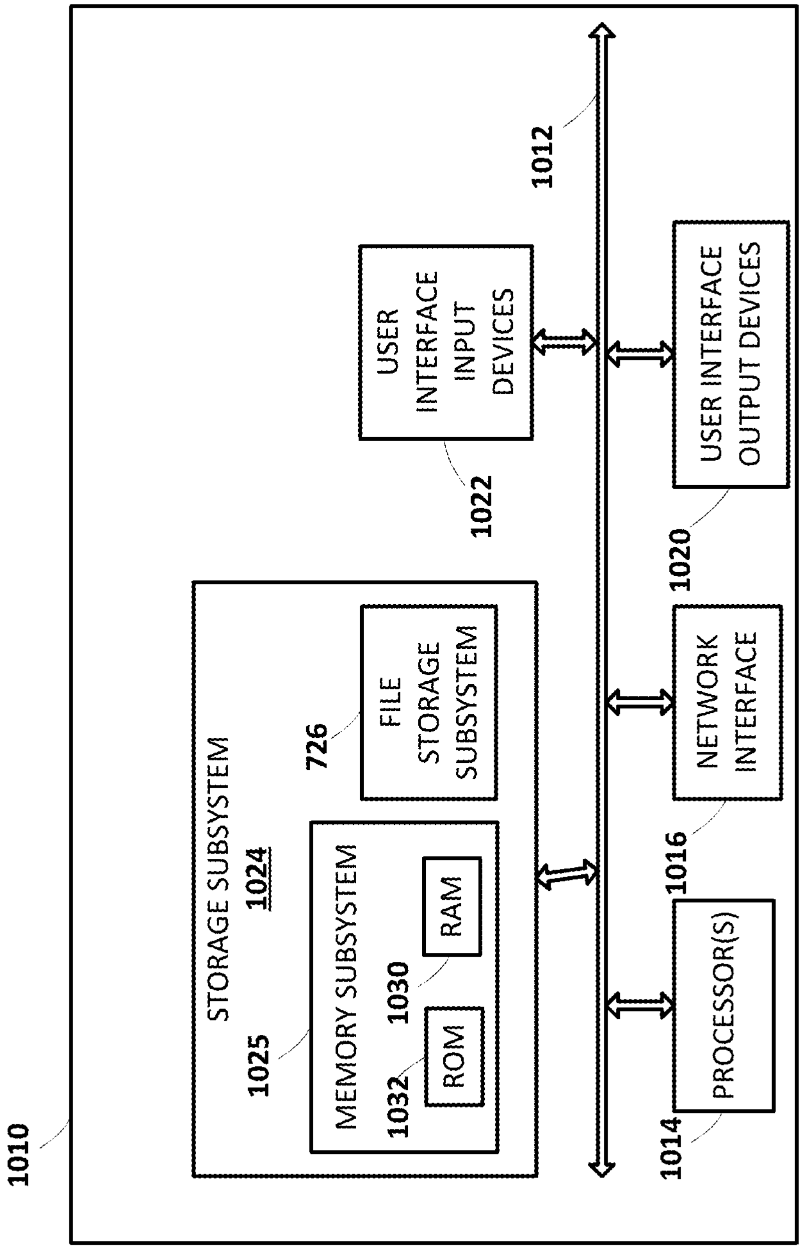
FIG. 10 schematically depicts an example architecture of a computer system.

FIG. 10 is a block diagram of an example computing device 1010 that may optionally be utilized to perform one or more aspects of techniques described herein. Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the process 700 of FIG. 7 and/or process 800 of FIG. 8.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple buses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In some implementations, a method implemented by one or more processors is provide, the method includes receiving an instance of natural language (NL) text input, wherein the instance of NL text input indicates a task for a robot to perform in an environment, wherein the robot has a plurality of legs, and wherein the robot is on a surface in the environment. In some implementations, the method includes processing the instance of NL text input using a large language model (LLM) to generate a foot contact pattern, wherein the foot contact pattern indicates a sequence of leg positions relative to the surface, of the plurality of legs of the robot, and wherein one or more of the legs of the robot are in contact with the surface. In some implementations, the method includes generating control output by processing the foot contact pattern using a locomotion controller of the robot. In some implementations, the method includes causing the robot to perform one or more actions based on the control output.

These and other implementations of the technology can include one or more of the following features.

In some implementations, the foot contact pattern indicates whether one or more of the legs of the robot are in contact with the surface and wherein the foot contact pattern further indicates whether one or more legs of the robot are not in contact with the surface. For example, a first set of the leg positions of the sequence can indicate contact with the surface, and a second set of leg positions of the sequence, that is distinct from the first set, can indicate non-contact with the surface.

In some implementations, the foot contact pattern indicates whether the one or more legs of the robot are in contact with the surface, wherein the foot contact pattern further indicates whether one or more of the legs of the robot not in contact with the surface are a first distance from the surface, and wherein the foot contact pattern further indicates whether one or more of the legs of the robot not in contact with the surface are a second distance from the surface. For example, a first set of leg positions of the sequence can indicate contact with the surface; a second set of leg positions of the sequence, that is distinct from the first set, can indicate non-contact with the surface at a first distance from the surface; and a third set of leg positions of the sequence, that is distinct from the first set and the second set, can indicate non-contact with the surface at a second distance from the surface, where the second distance from the surface is distinct from the first distance.

In some implementations, the task for the robot to perform in the environment, indicated by the instance of NL text input, is a locomotion task with a target gait of the robot. In some versions of those implementations, the target gait of the robot is a cyclic motion pattern that produces locomotion through a sequence of contacts with the surface. In some versions of those implementations, the target gait of the robot includes a bounding gait, a trotting gait, a pacing gait, standing still, and/or standing on three legs.

In some implementations, the robot is a quadruped robot and wherein the plurality of legs of the robot includes a front left leg, a front right leg, a rear left leg, and a rear right leg.

In some implementations, processing the instance of NL text input using the LLM to generate the foot contact pattern includes generating a prompt for the LLM based on the instance of NL text input. In some implementations, the method further includes generating the foot contact pattern based on processing the LLM prompt using the LLM. In some versions of those implementations, the prompt for the LLM, that is based on the instance of NL text input, includes one or more general instructions for the LLM, wherein the one or more general instructions for the LLM include instructions to translate the NL text input into the foot contact pattern, and wherein the one or more general instructions are in addition to any of the NL text input. In some versions of those implementations, the prompt for the LLM, that is based on the instance of NL text input, further includes one or more gait definitions, wherein each gait, of the one or more gait definitions, includes a NL text description of the gait, and wherein the NL text description of each gait is in addition to any of the NL text input.

In some versions of those implementations, the NL text description of one or more of the gaits, of the one or more gait definitions, includes NL text indicating an emotion corresponding to the gait. In some versions of those implementations, the prompt for the LLM, that is based on the instance of NL text input, further includes one or more foot contact pattern output instructions, wherein the one or more foot contact pattern output instructions include NL text description of how to format the foot contact pattern, and wherein the NL text description of how to format the foot contact pattern is in addition to any of the NL text input.

In some versions of those implementations, the prompt for the LLM, that is based on the instance of NL text input, further includes one or more example foot contact patterns.

In some implementations, the NL text input, or additional input, includes a user defined velocity for the robot in performance of the task in the environment. In some versions of those implementations, generating the control output by processing the foot contact pattern using the locomotion controller of the robot includes identifying a current state of one or more components of the robot. In some implementations, the method further includes generating the control output by processing, using the locomotion controller, (1) the current state of the one or more components of the robot, (2) the user defined velocity for the robot, and (3) the foot contact pattern.

In some implementations, a control policy of the locomotion controller is trained using one or more training foot contact patterns, where each of the training foot contact patterns is generated using a random pattern generator based on a training gait. In some versions of those implementations, training the control policy of the locomotion controller using a given training foot contact pattern, of the one or more training foot contact patterns includes processing the given training foot contact pattern using the control policy of the locomotion controller to generate a sequence of robot actions and corresponding robot states. In some implementations, the method further includes determining a reward based on processing the sequence of robot actions and corresponding robot states and/or the training foot contact pattern. In some implementations, the method further includes updating one or more portions of the control policy of the locomotion controller based on the reward. In some versions of those implementations, determining the reward based on processing the sequence of robot actions and corresponding robot states and/or the training foot contact pattern includes generating the reward based on processing the sequence of robot actions and corresponding robot states and/or the training foot contact pattern to maximize an expected reward. In some versions of those implementations, the LLM is fine-tuned based on the generated reward. In some versions of those implementations, prior to receiving the instance of NL text input, wherein fine-tuning the LLM is based on a previously generated reward, wherein the previously generated reward is generated based on processing a prior sequence of robot actions and prior corresponding robot states and/or a prior training foot contact pattern.

In some implementations, the instance of NL text input is a text representation of a spoken utterance captured in an instance of audio data and/or the NL text input is an instance of text provided by a user via a keyboard.

In some implementations, a method implemented by one or more processors is provided, the method includes training a locomotion controller to generate control output for controlling a robot with a plurality of legs on a surface in the environment. In some implementations, the control output is generated based on processing a foot contact pattern using the locomotion controller. In some implementations, the foot contact pattern indicates a sequence of leg positions relative to the surface, of the plurality of legs of the robot where one or more of the legs of the robot are in contact with the surface. In some implementations, training the control policy of the locomotion controller includes selecting a training foot contact pattern generated based on a training gait using a random pattern generator. In some implementations, the method includes processing the training foot contact pattern using the control policy of the locomotion controller to generate a sequence of robot actions and corresponding robot states for use in controlling locomotion of the robot. In some implementations, the method includes determining a reward based on processing the sequence of robot actions and corresponding robot states and/or the training foot contact pattern. In some implementations, the method includes updating one or more portions of the control policy of the locomotion controller based on the reward.

These and other implementations of the technology can include one or more of the following features.

In some implementations, the method further includes transmitting the control policy of the locomotion controller for use in controlling a given robot.

Other implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations can include a system of one or more computers and/or one or more robots that include one or more processors operable to execute stored instructions to perform a method such as one or more of the methods described herein.

What is claimed is:

1. A method implemented by one or more processors, the method comprising:

receiving an instance of natural language (NL) text input, wherein the instance of NL text input indicates a task for a robot to perform in an environment, wherein the robot has a plurality of legs, and wherein the robot is on a surface in the environment;

processing the instance of NL text input using a large language model (LLM) to generate a foot contact pattern, wherein the foot contact pattern indicates a sequence of leg positions relative to the surface, of the plurality of legs of the robot, and wherein one or more of the legs of the robot are in contact with the surface;

generating control output by processing the foot contact pattern using a locomotion controller of the robot; and causing the robot to perform one or more actions based on the control output.

2. The method of claim 1, wherein the foot contact pattern indicates whether one or more of the legs of the robot are in contact with the surface and wherein the foot contact pattern further indicates whether one or more of the legs of the robot are not in contact with the surface.

3. The method of claim 1, wherein the foot contact pattern indicates whether the one or more legs of the robot are in contact with the surface, wherein the foot contact pattern further indicates whether one or more of the legs of the robot not in contact with the surface are a first distance from the surface, and wherein the foot contact pattern further indicates whether one or more of the legs of the robot not in contact with the surface are a second distance from the surface.

4. The method of claim 1, wherein the task for the robot to perform in the environment, indicated by the instance of NL text input, is a locomotion task with a target gait of the robot.

5. The method of claim 4, wherein the target gait of the robot is a cyclic motion pattern that produces locomotion through a sequence of contacts with the surface.

6. The method of claim 4, wherein the target gait of the robot includes a bounding gait, a trotting gait, a pacing gait, standing still, and/or standing on three legs.

7. The method of claim 1, wherein the robot is a quadruped robot and wherein the plurality of legs of the robot includes a front left leg, a front right leg, a rear left leg, and a rear right leg.

8. The method of claim 1, wherein processing the instance of NL text input using the LLM to generate the foot contact pattern comprises:

generating a prompt for the LLM based on the instance of NL text input; and generating the foot contact pattern based on processing the LLM prompt using the LLM.

9. The method of claim 8, wherein the prompt for the LLM, that is based on the instance of NL text input, includes one or more general instructions for the LLM, wherein the one or more general instructions for the LLM include instructions to translate the NL text input into the foot contact pattern, and wherein the one or more general instructions are in addition to any of the NL text input.

10. The method of claim 9, wherein the prompt for the LLM, that is based on the instance of NL text input, further includes one or more gait definitions, wherein each gait, of the one or more gait definitions, includes an NL text description of the gait, and wherein the NL text description of each gait is in addition to any of the NL text input.

11. The method of claim 10, wherein the NL text description of one or more of the gaits, of the one or more gait definitions, includes NL text indicating an emotion corresponding to the gait.

12. The method of claim 10, wherein the prompt for the LLM, that is based on the instance of NL text input, further includes one or more foot contact pattern output instructions, wherein the one or more foot contact pattern output instructions include an NL text description of how to format the foot contact pattern, and wherein the NL text description of how to format the foot contact pattern is in addition to any of the NL text input.

13. The method of claim 12, wherein the prompt for the LLM, that is based on the instance of NL text input, further includes one or more example foot contact patterns.

14. The method of claim 1, wherein the NL text input, or additional input, includes a user defined velocity for the robot in performance of the task in the environment, and wherein generating the control output by processing the foot contact pattern using the locomotion controller of the robot comprises:

identifying a current state of one or more components of the robot; and generating the control output by processing, using the locomotion controller, (1) the current state of the one or more components of the robot, (2) the user defined velocity for the robot, and (3) the foot contact pattern.

15. The method of claim 1, wherein a control policy of the locomotion controller is trained using one or more training foot contact patterns, wherein each of the training foot contact patterns is generated using a random pattern generator based on a training gait.

16. The method of claim 15, wherein training the control policy of the locomotion controller using a given training foot contact pattern, of the one or more training foot contact patterns, comprises:

processing the given training foot contact pattern using the control policy of the locomotion controller to generate a sequence of robot actions and corresponding robot states;

determining a reward based on processing the sequence of robot actions and corresponding robot states and/or the training foot contact pattern; and updating one or more portions of the control policy of the locomotion controller based on the reward.

17. The method of claim 16, wherein determining the reward based on processing the sequence of robot actions and corresponding robot states and/or the training foot contact pattern comprises:

generating the reward based on processing the sequence of robot actions and corresponding robot states and/or the training foot contact pattern to maximize an expected reward.

18. The method of claim 16, wherein the LLM is fine-tuned based on the reward.

19. The method of claim 16, wherein, prior to receiving the instance of NL text input, fine-tuning the LLM is based on a previously generated reward, wherein the previously generated reward is generated based on processing a prior sequence of robot actions and prior corresponding robot states and/or a prior training foot contact pattern.

20. The method of claim 1, wherein the instance of NL text input is a text representation of a spoken utterance captured in an instance of audio data and/or the NL text input is an instance of text provided by a user via a keyboard.

21. A method implemented by one or more processors, the method comprising:

training a control policy of a locomotion controller to generate control output for controlling a robot with a plurality of legs on a surface in an environment, wherein the control output is generated based on processing a foot contact pattern using the locomotion controller, wherein the foot contact pattern indicates a sequence of leg positions relative to the surface, of the plurality of legs of the robot where one or more of the legs of the robot are in contact with the surface, and wherein training the control policy of the locomotion controller comprises:

selecting a training foot contact pattern generated based on a training gait using a random pattern generator;

processing the training foot contact pattern using the control policy of the locomotion controller to generate a sequence of robot actions and corresponding robot states for use in controlling locomotion of the robot;

determining a reward based on processing the sequence of robot actions and corresponding robot states and/or the training foot contact pattern; and updating one or more portions of the control policy of the locomotion controller based on the reward.

22. The method of claim 21, further comprising:

transmitting the control policy of the locomotion controller for use in controlling a given robot.

* * * * *